(12) United States Patent
Horng et al.

(10) Patent No.: US 8,702,403 B2
(45) Date of Patent: *Apr. 22, 2014

(54) FAN

(75) Inventors: Alex Horng, Kaohsiung (TW);
Ko-Chien Wang, Kaohsiung (TW);
Yeh-Feng Chen, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 392 days.

This patent is subject to a terminal disclaimer.

(21) Appl. No.: 13/004,927

(22) Filed: Jan. 12, 2011

(65) Prior Publication Data

US 2012/0114472 A1  May 10, 2012

(30) Foreign Application Priority Data

Nov. 8, 2010 (TW) .............................. 099138331 A

(51) Int. Cl.
| | | |
|---|---|---|
| F04B 17/00 | (2006.01) | |
| F04B 35/04 | (2006.01) | |
| F04D 5/00 | (2006.01) | |
| F04D 23/00 | (2006.01) | |
| F01D 1/02 | (2006.01) | |
| F01D 1/12 | (2006.01) | |
| F03B 1/00 | (2006.01) | |
| F03B 3/16 | (2006.01) | |
| F03D 1/00 | (2006.01) | |
| F03D 3/00 | (2006.01) | |
| F03D 5/00 | (2006.01) | |
| F04D 29/44 | (2006.01) | |
| F04D 29/54 | (2006.01) | |

(52) U.S. Cl.
USPC .................. 417/423.7; 417/423.14; 415/53.1; 415/54.1; 415/205

(58) Field of Classification Search
USPC .................. 417/423.1, 423.7, 423.9, 423.14; 415/203, 204, 205, 53.1, 54.1
See application file for complete search history.

(56) References Cited

U.S. PATENT DOCUMENTS

| | | | | |
|---|---|---|---|---|
| 3,274,410 | A | * | 9/1966 | Ragnar Boivie ................ 310/62 |
| 5,554,004 | A | * | 9/1996 | Stewart ......................... 416/185 |
| 5,879,141 | A | * | 3/1999 | Yokozawa et al. ......... 417/423.7 |
| 6,210,101 | B1 | | 4/2001 | Horng |
| 6,561,759 | B1 | | 5/2003 | Muschelknautz |

(Continued)

FOREIGN PATENT DOCUMENTS

| | | |
|---|---|---|
| DE | 4023261 A1 | 2/1991 |
| GB | 983101 A | 2/1965 |

(Continued)

*Primary Examiner* — Peter J Bertheaud
*Assistant Examiner* — Lilya Pkarskaya
(74) *Attorney, Agent, or Firm* — Alan Kamrath; Kamrath IP Lawfirm, P.A.

(57) ABSTRACT

A fan includes a housing having a compartment formed inside, and at least one lateral air inlet and at least one lateral air outlet both penetrating through the inner and outer surfaces of the housing and communicating with the compartment. A motor is mounted inside the compartment of the housing and has a stator and an impeller, with the impeller rotatably coupled to the stator and further containing a hub and a plurality of blades mounted to a top of the hub. Each blade has a first end and a second end in the radial direction of the impeller opposite to each other, with the first end of each blade facing outward, and with the second ends of the plural blades defining an airflow-area.

13 Claims, 6 Drawing Sheets

(56) References Cited

U.S. PATENT DOCUMENTS

| | | | |
|---|---|---|---|
| 6,652,223 B1 * | 11/2003 | Horng et al. | 415/53.1 |
| RE38,382 E * | 1/2004 | Miyahara et al. | 361/697 |
| 7,207,779 B2 | 4/2007 | Horng et al. | |
| 7,255,532 B2 * | 8/2007 | Zheng | 415/183 |
| 7,492,587 B2 * | 2/2009 | Chang | 361/679.44 |
| 2004/0123459 A1 * | 7/2004 | Makinson et al. | 29/889.23 |
| 2004/0258527 A1 * | 12/2004 | Kaneko et al. | 416/182 |
| 2007/0041857 A1 * | 2/2007 | Fleig | 417/423.14 |
| 2007/0166177 A1 | 7/2007 | Lopatinsky et al. | |
| 2010/0104421 A1 * | 4/2010 | Hwang et al. | 415/119 |
| 2010/0189557 A1 * | 7/2010 | Broom | 415/203 |
| 2010/0290923 A1 * | 11/2010 | Liu | 417/63 |
| 2011/0079374 A1 * | 4/2011 | Horng et al. | 165/121 |

FOREIGN PATENT DOCUMENTS

| | | |
|---|---|---|
| JP | 2003307198 A | 10/2003 |
| JP | 2005214107 A | 8/2005 |
| KR | 20-0205488 | 12/2000 |
| TW | 553323 Y | 9/2003 |

* cited by examiner

FAN

BACKGROUND OF THE INVENTION

1. Field of the Invention

The present invention relates to a fan and, more particularly, to a fan that can conduct air currents to flow in and to flow out radially through a radial direction of an impeller.

2. Description of the Related Art

Conventional fans are mainly divided into two types: an axial-flow type and a blower type. Each fan of the axial-flow type has an axial air inlet and an axial air outlet in the axial direction thereof opposite to each other, which can conduct airflows directly flowing in and flowing out via the axial air inlet and the axial air outlet to dissipate heat. On the other hand, each fan of the blower type has an axial air inlet in the axial direction thereof, and a radial air outlet in the radial direction thereof, which can dissipate heat by inhaling air through the axial air inlet and sequentially exhaling air via the radial air outlet.

However, fans of the axial-flow type can not provide radial heat-dissipation, because there is no passageway of airflows in the radial direction. Therefore, fans of the axial-flow type have to be disposed on the heat source, for example at the top of the central processor of a personal computer, when it is practically used in any electric equipment. In this situation, the axial height of the electric equipment needs to be maintained at a proper range for the axial-flow fan to be axially mounted on the heat source, which leads to difficulty in axial miniaturization of the electric equipment. Yet, fans of the blower type are not suitable for using in electric equipment that only allow for a radial airflow, such as mobile phones and personal digital assistants, due to the allocations of the axial air inlets of the blower type fan.

Accordingly, another type of conventional fans, which is capable of inhaling and exhaling air flowing in a radial direction of an impeller, is designed in order to adapt to electric equipment that only allow for radial airflow. As shown in FIG. 1, a conventional fan 8 disclosed in Taiwan Patent Issue No. 553323 and entitled "FAN STRUCTURE HAVING HORIZONTAL CONVECTION" comprises a housing 81 and an impeller 82. The housing 81 has at least one air inlet 811 and at least one air outlet 812, with a horizontal air-passageway 813 defined between the air inlet 811 and the air outlet 812. The impeller 82 is mounted inside the horizontal air-passageway 813 and comprises a hub 821 and a plurality of blades 822 mounted to the peripheral surface of the hub 821. Accordingly, the difference in air pressure between the air inlet 811 and the air outlet 812, generated by the rotating impeller 82, can facilitate the heat-dissipation by driving air currents flowing from the air inlet 811 through the horizontal air-passageway 813 to the air outlet 812.

However, when the airflows are conducted by the plural blades 822 of the impeller 82 and pass through the horizontal air-passageway 813 for air convection, the hub 821 easily disturbs the airflows as well as generates air turbulence due to the location of the hub 821. Hence, the cooling efficiency of the conventional fan 8 is limited.

Also, another conventional fan 9 is described in Taiwan Patent Issue No. 477492, entitled "CONNECTION OF BLOWER FAN" and shown in FIG. 2 and comprises a rotor seat 91, an impeller 92 and a housing 93. The rotor seat 91 has plural blocks 911, and the impeller 92 has plural holes 921, with the plural blocks 911 respectively coupled to the plural holes 921. The housing 93 is used for containing the rotor seat 91 and the impeller 92, and the housing 93 has an air inlet 931 and an air outlet 932. In this way, the rotating impeller 92 propels airflows radially flowing into the housing 93 from the air inlet 931 and sequentially flowing out from the air outlet 932 for heat-dissipation.

Nevertheless, the rotor seat 91 and the impeller 92 are both located in the air passageway between the air inlet 931 and the air outlet 932, which causes air turbulences easily to the airflows conducted by the impeller 92 because of the disturbance of the rotor seat 91. Also, an additional step to assemble the impeller 92 and the rotor seat 91 need to be executed before they are inserted into the housing 93 so that the fabrication of the conventional fan 9 is inconvenient and troublesome.

SUMMARY OF THE INVENTION

The primary objective of this invention is to provide a fan whose impeller can effectively prevent air disturbances when it conducts airflows to radially flow in and radially flow out.

A fan comprises a housing having a compartment formed inside, and at least one lateral air inlet and at least one lateral air outlet both penetrating through the inner and outer surfaces of the housing and communicating with the compartment. A motor is mounted inside the compartment of the housing and has a stator and an impeller, with the impeller rotatably coupled to the stator and further containing a hub and a plurality of blades mounted to a top of the hub. Each blade has a first end and a second end in the radial direction of the impeller opposite to each other, with the first end of each blade facing outward, and with the second ends of the plural blades defining an airflow-area.

Further scope of the applicability of the present invention will become apparent from the detailed description given hereinafter. However, it should be understood that the detailed description and specific examples, while indicating preferable embodiments of the invention, are given by way of illustration only, since various others will become apparent from this detailed description to those skilled in the art.

BRIEF DESCRIPTION OF THE DRAWINGS

The present invention will become more fully understood from the detailed description given herein below and the accompanying drawings which are given by way of illustration only, and thus are not limitative of the present invention, and wherein.

Figure 1:
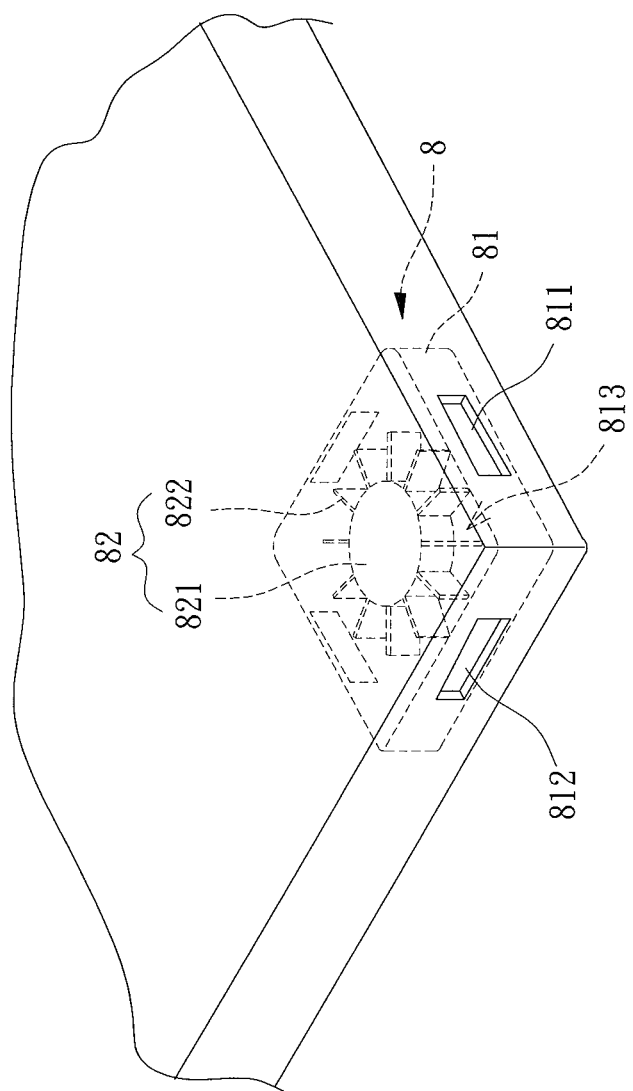
FIG. 1 is a perspective illustrating a conventional fan.
Figure 2:
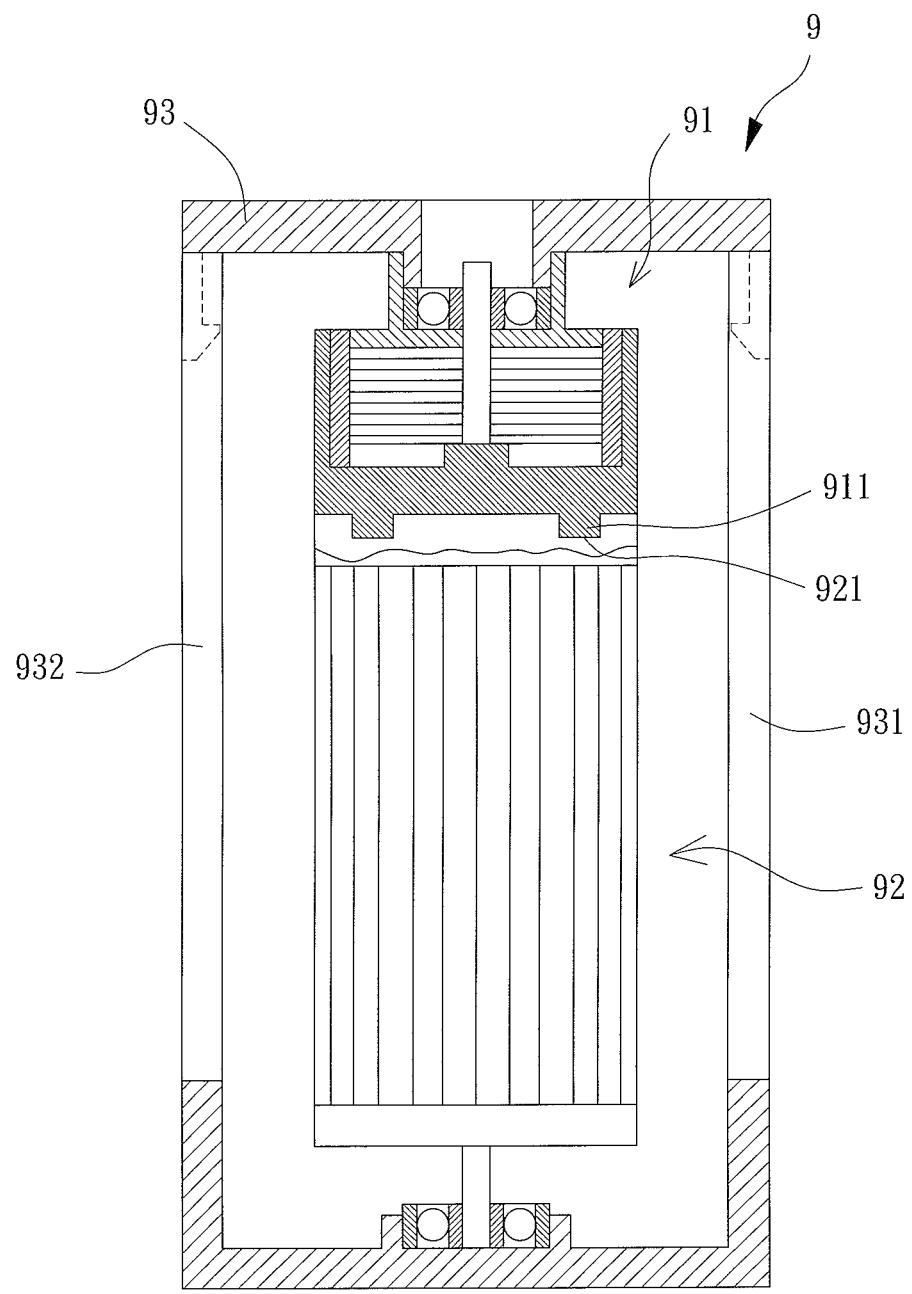
FIG. 2 is a cross sectional view of another conventional fan.

All figures are drawn for ease of explaining the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions conforming to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "end", "portion", "section", "top", "bottom", "axial", "radial", "spacing", and similar terms are used herein, it should be understood that these terms refer only to the structure shown in the drawings as it would appear to a person viewing the drawings, and are utilized only to facilitate describing the invention.

DETAILED DESCRIPTION OF THE INVENTION

Figure 3:
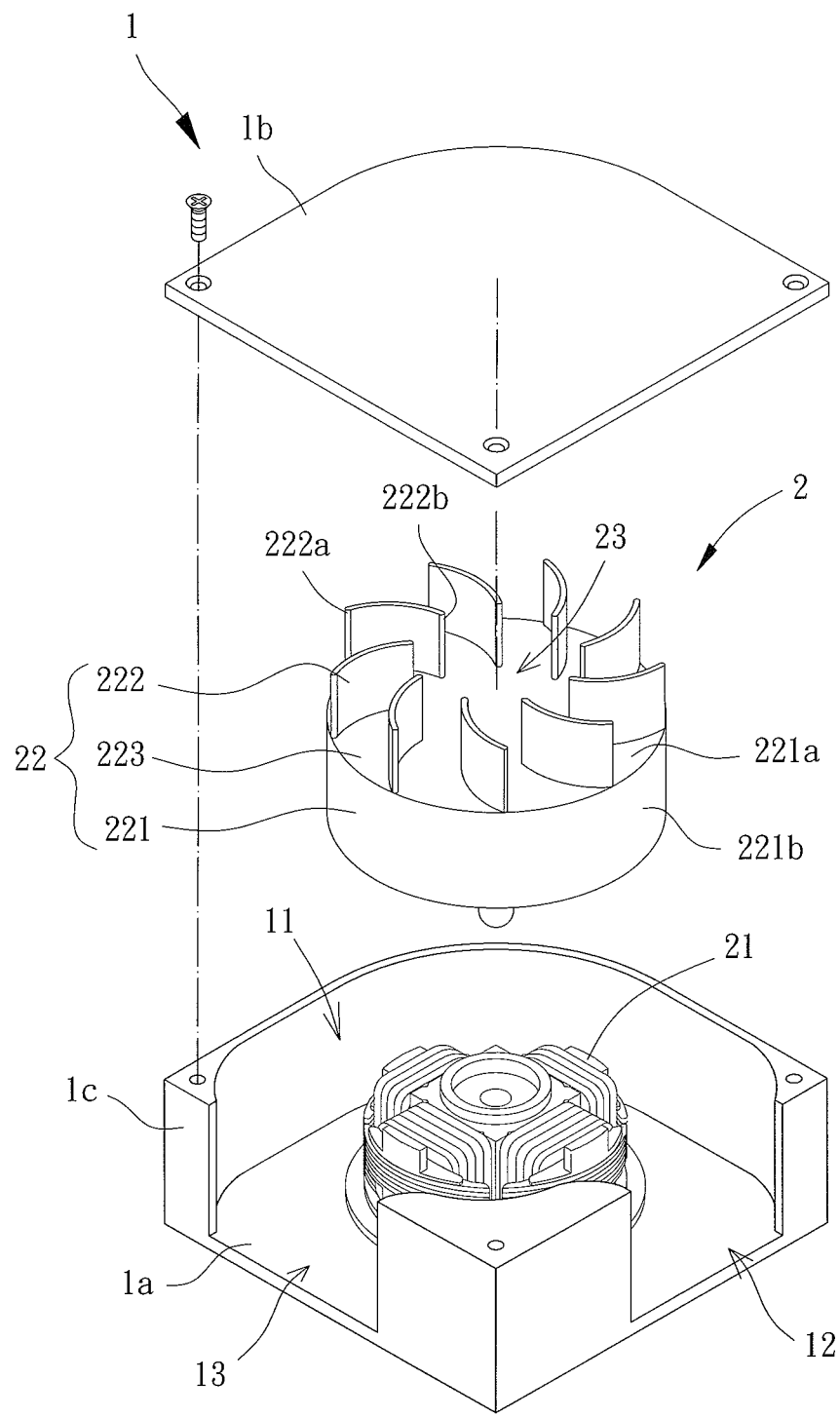
FIG. 3 is an exploded perspective illustrating a fan in accordance with a first embodiment of the present invention.
Figure 4:
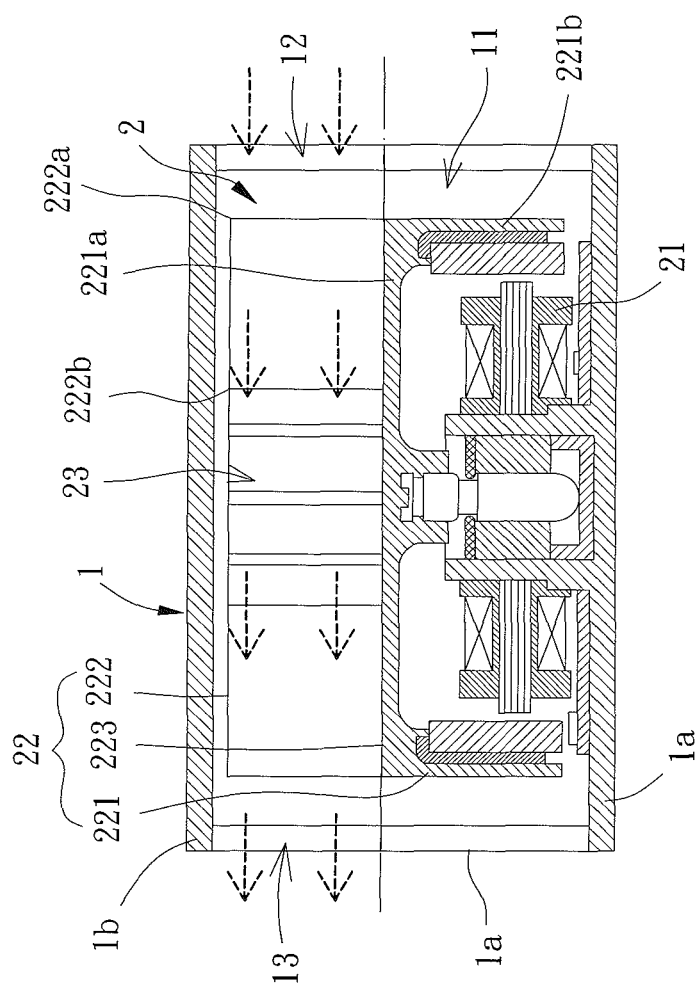
FIG. 4 shows a cross sectional view of the fan in accordance with the first embodiment of the present invention.

Referring to FIGS. 3 and 4, in accordance with a first embodiment of the present invention, the fan comprises a housing 1 and a motor 2. The housing 1 provides a frame structure for driving airflows to flow in a radial direction. The motor 2 is mounted to the inner part of the housing 1.

The housing 1 is any possible hollow frame structure for not only containing the motor 2, but also radially bringing in and bringing out airflows. The housing 1 has a support portion 1a, a cover portion 1b and a lateral wall portion 1c, with the support portion 1a opposite to the cover portion 1b, with the lateral wall portion 1c linking and sandwiched in between the support portion 1a and the cover portion 1b, and with the support portion 1a, the cover portion 1b and the lateral wall portion 1c jointly defining a compartment 11. The lateral wall portion 1c has at least one lateral air inlet 12 and at least one lateral air outlet 13, with the at least one lateral air inlet 12 and the at least one lateral air outlet 13 penetrating through both the inner and outer surfaces of the lateral wall portion 1c, and communicating with the compartment 11.

In the embodiment of the present invention, the support portion 1a is a base; the lateral wall portion 1c is a plurality of lateral walls axially extending from a lateral edge of the base; and the cover portion 1b is a cover plate mounted to the top edge of the plurality of lateral walls. The compartment 11 is formed between the base and the cover plate, with the plurality of lateral walls surrounding the compartment 11. The lateral air inlet 12 and the lateral air outlet 13 are separately arranged in two of the lateral walls. In the present embodiment shown in FIG. 3, the lateral air inlet 12 and the lateral air outlet 13 can be formed respectively on connected two of the lateral walls. However, the lateral air inlet and outlet 12, 13 can also be arranged in opposite two of the lateral walls.

The motor 2 mounted to the housing 1 comprises a stator 21 and an impeller 22 (also called a rotor), with the stator 21 controlling the rotation of the impeller 22. The impeller 22 has a hub 221 and a plurality of blades 222, with each blade 222 mounted to the hub 221. The hub 221 has a top 223, with the top 223 facing the cover portion 1b. In the axial direction of the impeller 22, each blade 222 extends toward the cover portion 1b and extends over the top 223 of the hub 221. Moreover, in the radial direction of the impeller 22, each blade 222 has a first end 222a and a second end 222b opposite to each other, with the first end 222a of each blade 222 facing the lateral wall portion 1c, and with the second end 222b of each blade 222 surrounding an airflow-area 23 as shown in FIG. 3 of the present invention.

In the embodiment, the stator 21 of the motor 2 is mounted to the support portion 1a of the housing 1, and the hub 221 of the impeller 22 is rotatably coupled to the stator 21. The hub 221 includes a base plate 221a and a peripheral wall 221b, with the peripheral wall 221b surrounding the base plate 221a and connecting with the peripheral edge of the base plate 221a, and with the said top 223 arranged on the base plate 221a. In the present embodiment, each of the plural blades 222 is mounted to or integrally formed on the top 223 of the base plate 221a as shown in FIG. 3 so that the fabrication of the fan of the present invention can be significantly convenient. However, the plural blades 222 also can mount to the base plate 221a with the first end 222a of each blade 222 extending over the peripheral surface of the peripheral wall 221b.

In practical use, the stator 21 of the motor 2 generates a time-varying magnetic field to propel the rotation of the impeller 22. In this situation, the fan of the present invention is sufficient to apply to any possible electric equipment, with the plural blades 222 of the impeller 22 driving air currents to flow into the housing 1 via the lateral air inlet 12 and to sequentially flow out via the lateral air outlet 13, for the sake of effectively dissipating heat when the electric equipment is operating.

The fan of the present invention is characterized by conducting airflows to flow in and flow out the fan in a radial direction of the impeller 22 through the lateral air inlet 12 and the lateral air outlet 13. Accordingly, the fan of the present invention is capable of being applied to any possible electric equipment, and it is unnecessary to be disposed on the heat source. In this situation, the axial height of the electric equipment can be appropriately reduced, and also the cooling effect of the fan can be effectively promoted, especially for sites near the lateral air outlet 13. Furthermore, each blade 222 extends toward the cover portion 1b and extends over the top 223 of the hub 221 in the axial direction of the impeller 22, which makes the air current to smoothly flow from the lateral air inlet 12 to the lateral air outlet 13 for effective heat-dissipation of the fan.

Figure 5:
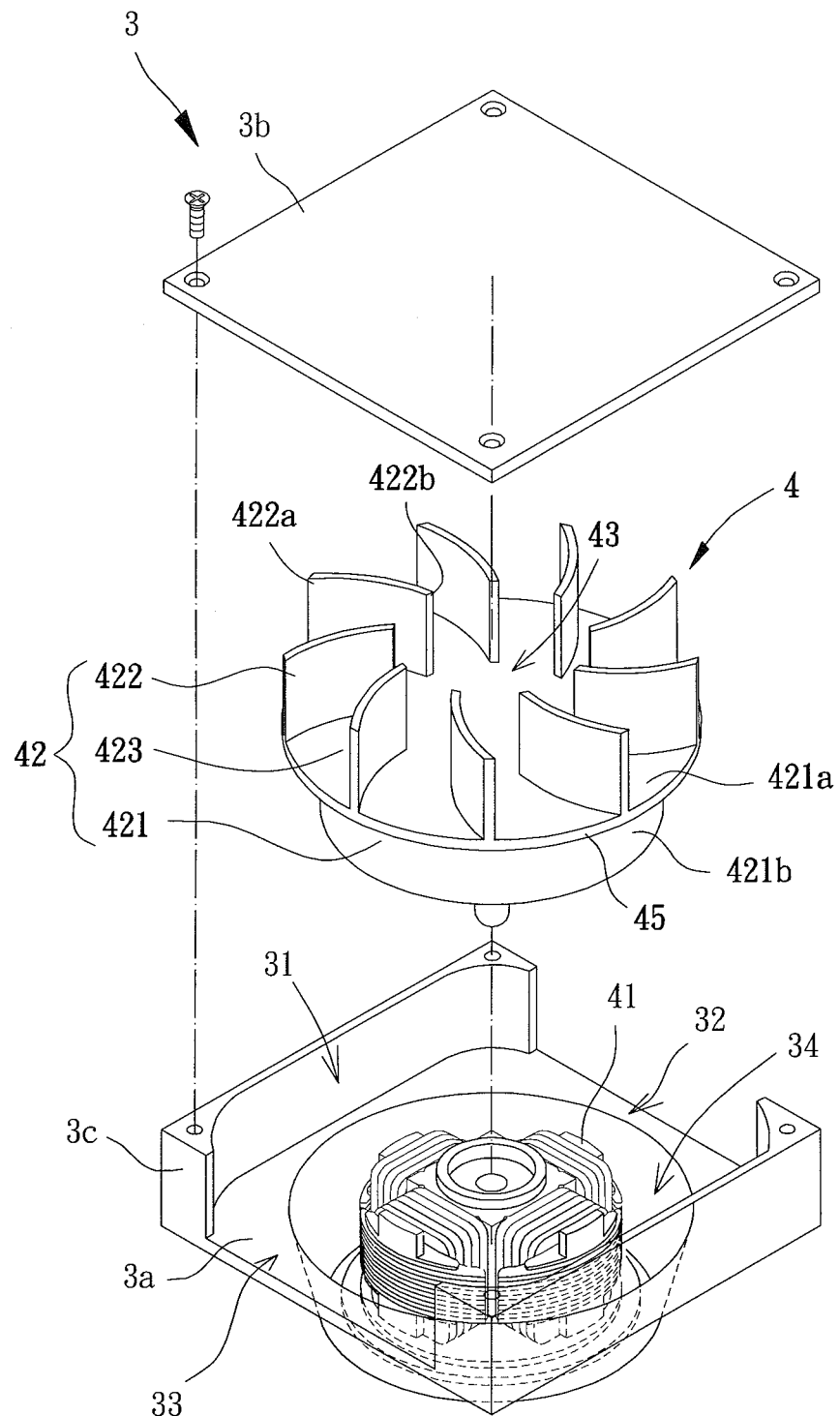
FIG. 5 is an exploded perspective illustrating a fan in accordance with a second embodiment of the present invention.
Figure 6:
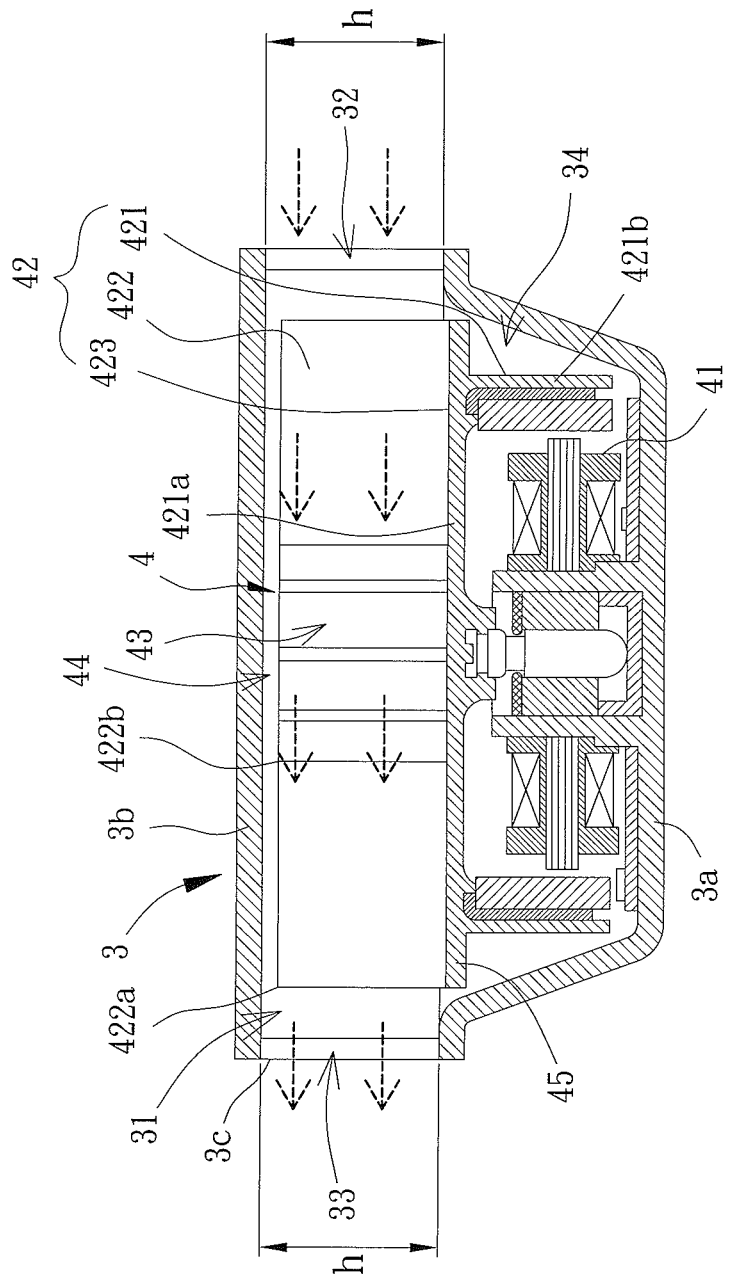
FIG. 6 shows a cross sectional view of the fan in accordance with the second embodiment of the present invention.

Referring to FIGS. 5 and 6, in accordance with a second embodiment of the present invention, the fan also comprises a housing 3 and a motor 4. Similarly to the first embodiment of the fan, the housing 3 and the motor 4 also have a support portion 3a, a cover portion 3b, a lateral wall portion 3c, a compartment 31, a lateral air inlet 32, a lateral air outlet 33, a stator 41, an impeller 42, a hub 421, a base plate 421a, a peripheral wall 421b, a plurality of blades 422, a first end 422a, a second end 422b, a top 423 and an airflow space, whose unnecessary details will not be further described in the following section.

Similarly, the support portion 3a is a base; the lateral wall portion 3c is a plurality of lateral walls axially extending from the peripheral edge of the base; and the cover portion 3b is a cover plate. It is noted that the major difference between the second embodiment and the first embodiment is that the support portion 3a has a fillister 34 in the center to contain the stator 41 and hub 421 of the motor 4.

Accordingly, a space between the top 423 of the hub 421 and the cover portion 3b delimits a lateral flow path 44 in the compartment 31, with the lateral flow path 44 containing each blade 422. Precisely, the main portion of the impeller 42 is excluded from the compartment 31, except the plural blades 422. As shown in FIG. 5, the lateral air inlet 32 and the lateral air outlet 33 are arranged in opposite two of the lateral walls (labeled as lateral wall portion 3c in the present invention), respectively. In the axial direction of the impeller 42, openings (h) of the lateral air inlet 32 and the lateral air outlet 33 extend between the cover portion 3b and the top 423, so that the lateral air inlet 32 and the lateral air outlet 33 correspond to the plural blades 422 respectively, and the hub 421 corresponds to the lateral wall portion 3c. As a result, due to the position of the hub 421 outside the flow path 44, air currents will not be disturbed by the hub 421 when they are circulating in the fan from the lateral air inlet 32 to the lateral air outlet 33, so that the cooling efficiency of fan can be advanced.

With reference to FIG. 6, in the radial direction of the impeller 42, the first end 422a of each blade 422 can radially extend toward the lateral wall portion 1c and over the peripheral wall 421b of the hub 421, to increase the air-driving area of each blade 422. Additionally, in this situation, a bottom plate 45 aligning with the base plate 421a and connecting with the bottom edge of each blade 422 and the peripheral wall 421b of the hub 421 is provided, which can enhance the structural strength of the plural blades 422 as well as the conduction of airflows.

In summary, with the design of the plural blades 222, 422 (which axially extend toward the cover portion 1b, 3b and extend over the top 223, 423 of the hub 221, 421, respectively) and the airflow-areas 23, 43, the fan of the present invention is sufficient to prevent air turbulence when air currents are driven by the impellers 22, 42 and to circulate flow from the lateral air inlets 12, 32 to the lateral air outlets 13, 33, also to improve the cooling effect of fan.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A fan comprising:
    a housing having a compartment formed inside, with the housing including at least one lateral air inlet and at least one lateral air outlet both penetrating through inner and outer surfaces of the housing and communicating with the compartment; and
    a motor mounted inside the compartment of the housing and having a stator and an impeller, with the impeller rotatably coupled about an axis to the stator and further containing a hub and a plurality of blades mounted to a top of the hub, with each blade having a first end and a second end in a radial direction of the axis of the impeller opposite to each other, with the first end of each blade facing outward, and with the second ends of the plurality of blades defining an airflow-area,
    wherein the housing further includes a cover portion and a lateral wall portion, with the lateral wall portion and the cover portion defining the compartment, with the lateral wall portion having the at least one lateral air inlet and the at least one lateral air outlet penetrating through the lateral wall portion and communicating with the compartment, with the cover portion facing the top of the hub, with each blade axially extending toward the cover portion and extending over the top of the hub, wherein the lateral air inlet is arranged between the cover portion and the top of the hub of the impeller, and wherein a height of the lateral air inlet parallel to the axis is equal to or smaller than a distance between the top of the hub and the cover portion parallel to the axis, with the at least one lateral air inlet and the at least one lateral air outlet in the lateral wall extending to the cover portion, with the top and the cover portion delimiting a lateral flow path parallel to the cover portion in the compartment from the at least one lateral air inlet through the at least one lateral air outlet, with the at least one lateral air inlet and the at least one lateral air outlet aligned in a plane perpendicular to the axis, with each blade being contained in the lateral flow path, and with the motor mounted outside of the lateral flow path.

2. The fan as defined in claim 1, wherein the housing includes a support portion and the lateral wall portion arranged between the support and cover portions, with the support portion, the cover portion and the lateral wall portion surrounding the compartment, and with the first end of each blade facing the lateral wall portion.

3. The fan as defined in claim 1, wherein the lateral air outlet axially corresponds with the position of the plurality of blades of the impeller.

4. The fan as defined in claim 2, with the top of the impeller and the cover portion delimiting a lateral flow path in the compartment, and with each blade being contained inside the lateral flow path.

5. The fan as defined in claim 2, wherein the support portion has a fillister arranged in the compartment, with the fillister connecting to the stator of the motor and containing the hub of the impeller.

6. The fan as defined in claim 2, wherein the support portion is a base, the lateral wall portion is a plurality of lateral walls axially extending through a lateral edge of the base, and the cover portion is a cover plate mounted to the plurality of lateral walls, with the cover plate and the base defining the compartment, and with the lateral air inlet and the lateral air outlet respectively arranged on connected two of the lateral walls.

7. The fan as defined in claim 2, wherein the support portion is a base, the lateral wall portion is a plurality of lateral walls axially extending through a lateral edge of the base, and the cover portion is a cover plate mounted to the plurality of lateral walls, with the cover plate and the base defining the compartment, and with the lateral air inlet and the lateral air outlet respectively arranged on opposite two of the lateral walls.

8. The fan as defined in claim 2, with the plurality of blades integrally formed on the top of the hub.

9. A fan comprising:
    a housing having a compartment formed inside, with the housing including at least one lateral air inlet and at least one lateral air outlet both penetrating through inner and outer surfaces of the housing and communicating with the compartment; and
    a motor mounted inside the compartment of the housing and having a stator and an impeller, with the impeller rotatably coupled about an axis to the stator and further containing a hub and a plurality of blades mounted to a top of the hub, with each blade having a first end and a second end in a radial direction of the axis of the impeller opposite to each other, with the first end of each blade facing outward, and with the second ends of the plurality of blades defining an airflow-area,
    wherein the housing includes a cover portion and a lateral wall portion, with the lateral wall portion and the cover portion defining the compartment, with the lateral wall portion having the at least one lateral air inlet and the at least one lateral air outlet penetrating through the lateral wall portion and communicating with the compartment, with the cover portion facing the top of the hub, with each blade axially extending toward the cover portion and extending over the top of the hub, wherein the lateral air outlet is arranged between the cover portion and the top of the hub of the impeller, and wherein a height of the lateral air outlet parallel to the axis is equal to or smaller than a distance between the top of the hub and the cover portion parallel to the axis, with the at least one lateral air inlet and the at least one lateral air outlet in the lateral wall extending to the cover portion, with the top and the cover portion delimiting a lateral flow path parallel to the cover portion in the compartment from the at least one lateral air inlet through the at least one lateral air outlet, with the at least one lateral air inlet and the at least one lateral air outlet aligned in a plane perpendicular to the axis, with each blade being contained in the lateral flow path, and with the motor mounted outside of the lateral flow path.

10. The fan as defined in claim 9, wherein the lateral air inlet axially corresponds with the position of the plurality of blades of the impeller.

11. A fan comprising:
a housing having a compartment formed inside, with the housing including at least one lateral air inlet and at least one lateral air outlet both penetrating through inner and outer surfaces of the housing and communicating with the compartment; and
a motor mounted inside the compartment of the housing and having a stator and an impeller, with the impeller rotatably coupled to the stator and further containing a hub and a plurality of blades mounted to a top of the hub, with each blade having a first end and a second end in a radial direction of the impeller opposite to each other, with the first end of each blade facing outward, and with the second ends of the plurality of blades defining an airflow-area,
wherein the housing includes a support portion, a cover portion and a lateral wall portion arranged between the support and cover portions, with the support portion, the cover portion and the lateral wall portion surrounding the compartment, with the lateral wall portion having the at least one lateral air inlet and the at least one lateral air outlet penetrating through the lateral wall portion and communicating with the compartment, with the cover portion extending parallel to the top of the hub, with the first end of each blade radially extending toward the lateral wall portion and extending beyond a peripheral wall of the hub in the radial direction of the impeller, with the at least one lateral air inlet and the at least one lateral air outlet in the lateral wall extending to the cover portion, with the top and the cover portion delimiting a lateral flow path parallel to the cover portion in the compartment from the at least one lateral air inlet through the at least one lateral air outlet, with the at least one lateral air inlet and the at least one lateral air outlet aligned in a plane perpendicular to the axis, with each blade being contained in the lateral flow path, and with the motor mounted outside of the lateral flow path.

12. The fan as defined in claim 11, with a bottom edge of the plurality of blades providing a bottom plate, and with the bottom plate connecting with the hub and extending parallel to the cover portion.

13. The fan as claimed in claim 12, wherein the hub comprises the top and a bottom face opposite to the top, wherein the top and the bottom face of the hub extend in the radial direction parallel to a bottom face of the cover portion, wherein the peripheral wall extends from the bottom face of the hub in an axial direction perpendicular to the radial direction to form a space, wherein the stator is received in the space, and wherein the bottom plate extends in the radial direction outward of the peripheral wall.

* * * * *